Dec. 15, 1936.  J. SCHICK  2,064,038
ELECTRIC MOTOR
Filed June 5, 1934  2 Sheets-Sheet 1
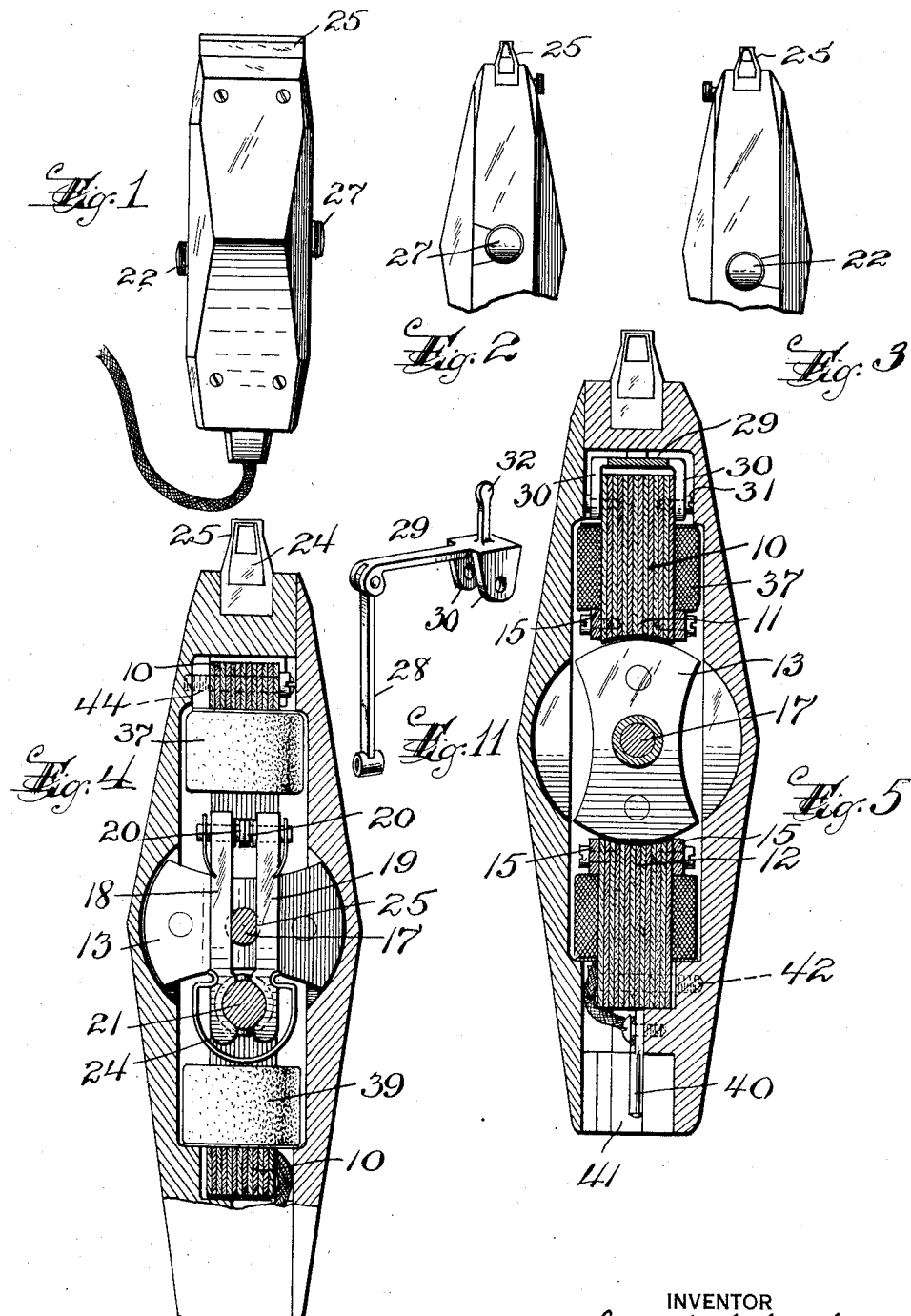
INVENTOR
Jacob Schick,
BY
Wm H. Caufield,
ATTORNEY.

Dec. 15, 1936.  J. SCHICK  2,064,038
ELECTRIC MOTOR
Filed June 5, 1934  2 Sheets-Sheet 2
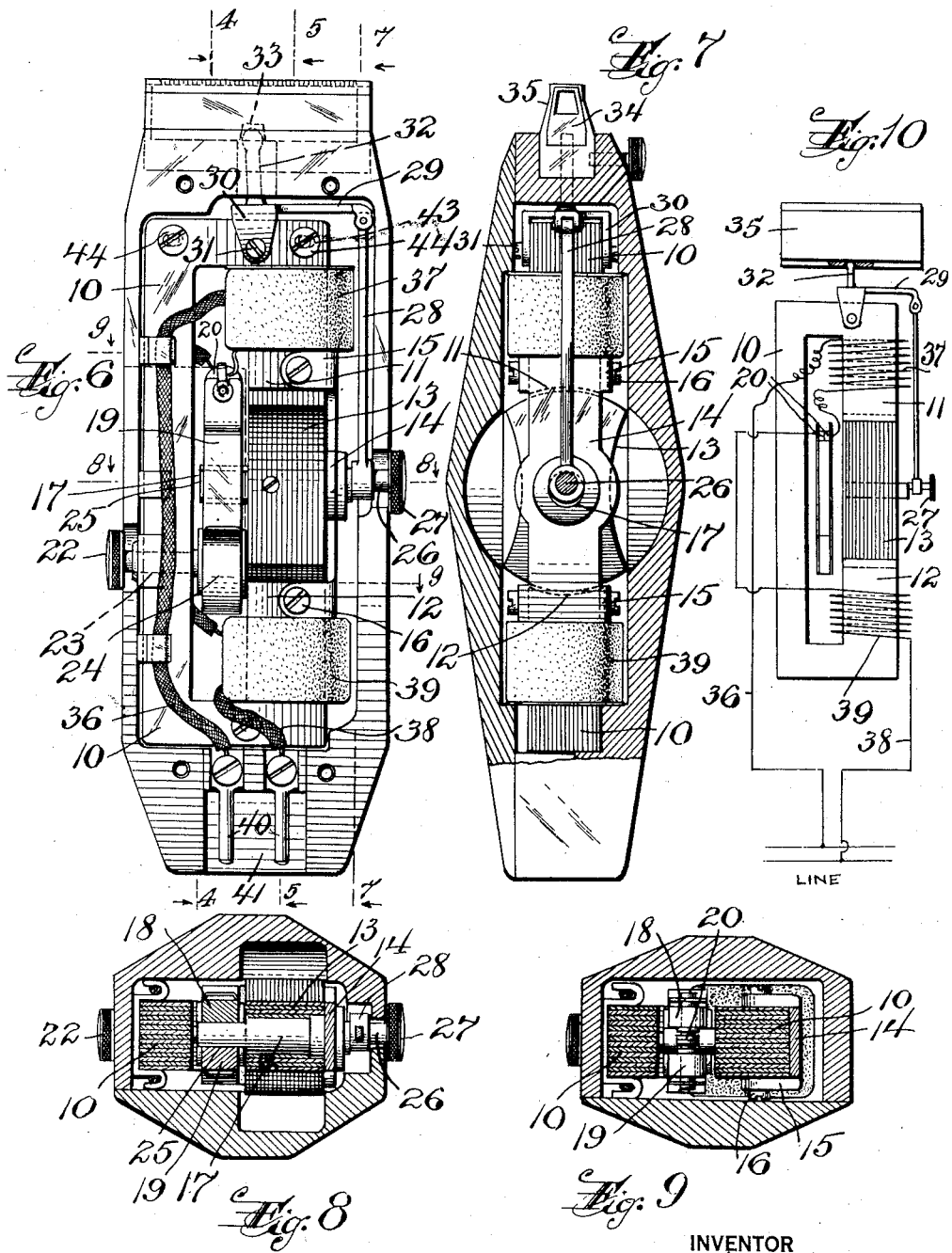
INVENTOR
Jacob Schick,
BY
Wm H Caufield
ATTORNEY Patented Dec. 15, 1936

2,064,038

UNITED STATES PATENT OFFICE 2,064,038

ELECTRIC MOTOR

Jacob Schick, Stamford, Conn., assignor, by mesne assignments, to Schick Industries Limited, Nassau, Bahama Islands, a corporation of Bahama Islands Application June 5, 1934, Serial No. 729,070

5 Claims. (Cl. 172—36)

This invention relates to an improved electric motor. The motor is improved in its operation due largely to an improved means for adjustment of the make-and-break device. The motor is particularly adaptable in small sizes such as are used in hand tools. For clearance of description and for ready illustration I show the motor installed in the handle of dry shaver.

The motor is of the magnetic type and the associated parts are all supported on the field magnet. This makes it possible to assemble a small motor and then install it as a unit in a suitable handle or holder. This makes it possible to make a motor more cheaply. The motor is also more compact than those heretofore made especially in the placing of the make-and-break device inside the frame of the field magnet. This disposition also makes it possible to operate the contacts directly from the shaft of the armature.

Details of construction are also novel in this improved motor and will be hereinafter more fully described and finally embodied in the claims.

In the drawings Figure 1 is a face view of a casing showing the starting and adjusting wheels of the motor. Figure 2 is a side view of the right hand side of Figure 1 and Figure 3 is a side view of the left hand side of Figure 1. Figure 4 is a section on line 4—4 in Figure 6. Figure 5 is a section on line 5—5 in Figure 6. Figure 6 is a face view of the motor with the lid of the casing removed. Figure 7 is a section on line 7—7 in Figure 6. Figure 8 is a section on line 8—8 in Figure 6. Figure 9 is a section on line 9—9 in Figure 6. Figure 10 is a diagrammatic view of the motor and the circuit. Figure 11 is a perspective view of a bell-crank lever used on the motor.

The drawings show a motor installed in a handle equipped with a shaving head which apparatus constitutes a dry shaver. The shaving head shown is of a well-known commercial type.

The motor is encased in the handle and for this reason must be small and compact and at the same time have considerable power. The motor comprises a field magnet 10 of oval or rectangular form with one side provided with a gap at the ends of which are the poles 11 and 12. The field magnet is, therefore, C-shaped, and is made up, as field magnets of the type are, of laminated metal, usually soft iron.

The armature 13 of laminated metal rotates between the poles in a plane parallel with the longitudinal dimension of the field magnet. The armature is supported by a bearing 14 of insulating material which bearing extends substantially straight across the gap and is provided with ears 15 secured by screws 16 to the field member at the poles. The C-shaped field member and the bearing form a rectangular motor with the operative parts of the motor all confined within the dimensions of the field member.

The armature is secured to a shaft 17 which is supported in the bearing 14 and projects from both ends of the bearing and beyond the armature, one end for starting and stopping purposes and the other end extending within the frame and thus positioned for operating the make-and-break or contact device.

The contact device comprises two arms 18 and 19 of insulating material which arms are provided with contact points 20. The arms are fulcrumed on a stud 21 which is non-circular in cross-section, being preferably elliptical. The arms 18 and 19 are located between the armature and the continuous side arm of the field magnet. The stud is fitted with a snug fit in the field magnet and has an outer projecting end fitted with a knob or handle 22, that portion of the stud that is in the field magnet being round as at 23. The arms 18 and 19 are yieldingly held in place by a spring 24. The end of the shaft 17 extends between the arms 18 and 19 and is non-circular where it engages them. The usual form is to flatten opposed sides of the shaft as at 25 which causes the shaft to exercise a cam action on the arms and to open and close the device as the shaft rotates. The elliptical stud acts as a regulator or adjustor to control the proper contact and thereby the speed of the motor. The stud is shown in Figure 4 at the position where the maximum of clearance can be secured at the contacts 20. It will be evident that if, for some reason such as wear or a slight variation in thickness the contacts do not properly engage one another, the stud 21 is slightly turned and this spreads the arms at the fulcrum and places the contacts 20 closer together. The reverse can be accomplished by turning the stud in the reverse direction to bring the fulcrum ends of the arms closer together. This control means can do no damage if the stud is rotated too far as the longer axis of the stud is as far as the adjustment can be made. The adjustment can be made while the motor is running thus enabling the proper duration and extent of contact to be secured.

The shaft 7 has its outer end provided with an eccentric part 26 which acts as a crank and is further provided with a handle or wheel 27. The crank 26 acts on a pitman 28 hinged at its end to a bell-crank 29. The bell crank is pivoted to the field magnet and I show two ears 30 flanking the field magnet and pivoted by screws or rivets 31. The bell-crank has a projecting arm 32 which is utilized to reciprocate the tool to which the motor is applied. I show the arm 32 as operative in the groove 33 of the inside cutter 34 of the shaving head 35. This shaving head, used only to illustrate one use for the motor, is of a well-known commercial type of dry shaver.

The bearing plate 15, the bell-crank ears 30 and the bearing for the stud 21 are made of material that is not affected by magnetism and I have used brass with good results.

The circuit used is of the usual wiring having the wire 36 leading to the coil 37 on one pole of the magnet and the wire 38 leading to the coil 39 on the other pole of the magnet, the wires continuing from the coils to the contacts 20 of the contact device. The wires 36 and 38 are provided with terminals 40 preferably placed in a recess 41 in the base of the handle and arranged to receive the usual plug.

The motor and its associated parts are in one unit, the field magnet directly supporting all the other parts. It can therefore be easily assembled and then installed complete in the handle. The preferred manner of fastening the motor is by a single screw 42 at one end of the motor which screw is fastened into the casing. The other end of the field magnet has slots 43 to provide lateral adjustment on the screws 44 by which they are securely fastened when in proper position.

Various changes can be made in the form and proportion of parts without departing from the scope of my invention.

I claim:—

1. An electric motor comprising a frame forming a field magnet with a gap to provide opposed poles on one side of the magnet, a rotary armature between the poles, a make-and-break device between the armature and the other side of the frame, a shaft on which the armature is secured, the shaft acting at its inner end to operate the device, a bearing secured to the magnet and bridging the gap and supporting the shaft, and a bell crank pivoted to the end of the magnet and having one end eccentrically connected to the shaft, the bell crank including an arm projecting to act as a vibrating arm.

2. An electric motor comprising a frame forming a field magnet with a gap to provide opposed poles on one side of the magnet, a rotary armature between the poles, a make-and-break device between the armature and the other side of the frame, a shaft on which the armature is secured, the shaft acting at its inner end to operate the device, a bearing secured to the magnet and bridging the gap and supporting the shaft, a bell crank pivoted to the end of the magnet and having one end eccentrically connected to the shaft, the bell crank including an arm projecting to act as a vibrating arm and a hand-wheel on the outer end of the shaft for stopping and starting the motor.

3. An electric motor comprising a rotary armature, a shaft driven by the armature, a pair of contact arms flanking the shaft, the shaft having a non-circular part where the arms embrace it, a pair of contacts on the arms, a non-circular fulcrum member at one end of the arms and common to both arms, the non-circular fulcrum being adjustable for varying the distance between the arms and a spring for holding the arms on the fulcrum and against the shaft.

4. In an electric motor, a make-and-break device comprising two arms, a spring to yieldingly force the arms toward each other, a shaft with an elliptical part to actuate the arms, an elliptical stud on which the arms are fulcrumed, the stud being adjustable for varying the distance between the arms at the fulcrum, and contact points on the free ends of the arms.

5. An electric motor for use in handles and the like, comprising a flat C-shaped field member, a bearing bridging the gap in the field member to form a complete frame, an armature shaft supported solely by the bearing and having an eccentric part on its outer end, an armature on the shaft between the ends of the field member, a non-circular part on the inner end of the shaft beyond the armature, a manually operable stud projecting through the field member opposite the bearing, a non-circular part on the inner end of the stud, contact arms bearing on opposite sides of the non-circular part of the stud and on opposite sides of the elliptical part of the shaft, a spring for holding the arms against the stud, and contact points on the free ends of the arms.

JACOB SCHICK.